US006771206B2

(12) United States Patent
Berthelier et al.

(10) Patent No.: US 6,771,206 B2
(45) Date of Patent: Aug. 3, 2004

(54) METHOD FOR OBTAINING UNDERGROUND IMAGERY USING A GROUND-PENETRATING RADAR

(75) Inventors: Jean-Jacques Berthelier, La Varenne (FR); Richard Ney, La Varenne Saint-Hilaire (FR); Alain Meyer, Longpont/s/ Orge (FR)

(73) Assignee: Centre National de la Recherches Scientifique, Paris (FR)

( * ) Notice: Subject to any disclaimer, the term of this patent is extended or adjusted under 35 U.S.C. 154(b) by 0 days.

(21) Appl. No.: 10/168,351

(22) PCT Filed: Dec. 12, 2000

(86) PCT No.: PCT/FR00/03490

§ 371 (c)(1),
(2), (4) Date: Feb. 4, 2003

(87) PCT Pub. No.: WO01/44833

PCT Pub. Date: Jun. 21, 2001

(65) Prior Publication Data

US 2003/0132873 A1 Jul. 17, 2003

(30) Foreign Application Priority Data

Dec. 14, 1999 (FR) .............................. 99 15768

(51) Int. Cl.[7] ................................................. G01V 3/12
(52) U.S. Cl. ......................... 342/22; 342/27; 342/188; 324/334
(58) Field of Search ............................ 342/22, 27, 188, 342/190, 191; 324/334, 339

(56) References Cited

U.S. PATENT DOCUMENTS

| 5,130,711 A | | 7/1992 | Kimura et al. ............. 342/22 |
| 5,327,139 A | * | 7/1994 | Johnson ...................... 342/22 |
| 5,969,661 A | * | 10/1999 | Benjamin ..................... 342/22 |
| 6,091,354 A | * | 7/2000 | Beckner et al. ............. 342/22 |
| 6,407,702 B1 | * | 6/2002 | Bergman et al. ............ 342/364 |

(List continued on next page.)

FOREIGN PATENT DOCUMENTS

| GB | 2292859 | 3/1996 |
| WO | WO99/13531 | 3/1999 |

OTHER PUBLICATIONS

"Electromagnetic field and material properties in ground penetrating radar", Olhoeft, G.R.; Advanced Ground Penetrating Rada 2003. Proceedings of the 2nd International Workshop on May 14–16, 2003 pp. 144–147.*
J. J. Berthelier et al., *The GPR Experiment on NETLANDER*; International Conference on Mars Exploration Program and Sample Return Missions, Paris, France, Feb. 2–5, 1999, Planetary and Space Science, Oct. –Dec., 2000, Elsevier, UK, pp. 1161–1180, XP–000998502.
A. Harris et al., *Network Science Landers for Mars*; BO.3 Symposium of COSPAR Scientific Commission B Held during the Thirty–Second COSPAR Scientific Assembly, Nagoya, Japan, Jul. 12–19, 1998, Advances in Space Research, 1999, Elsevier, UK, pp. 1915–1924, XP000938296.

*Primary Examiner*—John B. Sotomayor
(74) *Attorney, Agent, or Firm*—Conley Rose P.C.

(57) ABSTRACT

A method for using ground-penetrating radar to obtain subsurface imaging. The radar comprises resources for transmitting, receiving and processing signals. In one method embodiment, signals are transmitted from a fixed point relative to the subsurface and with the aid of at least two electrical antennae. Signals reflected or backscattered by reflectors or diffusers of the said subsurface are received by way of the electrical antennae and by way of three magnetic antennae. Finally, the reflected or backscattered signals are processed using an algorithm to obtain the imaging of the said subsurface.

14 Claims, 5 Drawing Sheets

U.S. PATENT DOCUMENTS

| | | | |
|---|---|---|---|
| 6,512,475 B1 * | 1/2003 | Bogatyrev et al. | 342/22 |
| 2002/0154064 A1 * | 10/2002 | Barnes | 343/770 |
| 2003/0062902 A1 * | 4/2003 | Stolarczyk | 324/334 |
| 2003/0063014 A1 * | 4/2003 | Stolarczyk | 340/853.5 |
| 2003/0132873 A1 * | 7/2003 | Berthelier et al. | 342/22 |
| 2003/0189428 A1 * | 10/2003 | Hansen et al. | 324/329 |

* cited by examiner

METHOD FOR OBTAINING UNDERGROUND IMAGERY USING A GROUND-PENETRATING RADAR

The present invention relates to subsurface imaging using ground-penetrating radar. It relates more particularly to a method that makes it possible, starting from a fixed point, to explore subsurface geological structures and to detect obstacles buried a short depth beneath the surface (pipelines in the field of civil engineering, mines in a military application, etc.).

According to another aspect of the invention, it relates to ground-penetrating radar implementing this method of subsurface imaging from a fixed point.

For planetary missions, and for Mars in particular, such ground-penetrating radar systems in fact seem to be the most suitable instruments for subsurface exploration; in particular this is because they are well adapted to the severe constraints that these missions impose on the mass and power of the measuring instruments.

On Earth, the use of radar for the exploration of subsurface geological structures generally requires a mobile instrument for gridding the terrain, effecting numerous measurements and using inversion algorithms for finding the structure of the underlying terrain. In fact, these instruments only record the distance of the reflectors or diffusers without measuring their direction relative to the transmitter and so can only give three-dimensional images of the subsurface provided they are moved over the surface to be probed. Now, during planetary missions such as that envisaged for the planet Mars, an automatic station will be set down on the planet's surface and the measurements will therefore be effected from a fixed point, the lander.

Radar systems on board satellites in orbit round the surface of the planet to be probed are also known, as detecting instruments. At present the main drawback of these radar systems is that they are not powerful enough, being too far from the surface, to permit detection beyond a depth of about 100 meters.

The present invention therefore aims to overcome the aforementioned drawbacks by proposing a method of subsurface imaging comprising ground-penetrating radar that permits determination of the direction of propagation of waves reflected or backscattered by subsurface inhomogeneities and therefore measurement not only of the distance of reflectors or diffusers but also of their direction relative to the transmitter without recourse to a mobile instrument; it then being possible, on the basis of the data obtained, to construct a three-dimensional image of the underground reflectors or diffusers by means of processing and analysis algorithms.

For this purpose, the method of subsurface imaging according to the invention, using ground-penetrating radar comprising means of transmitting, receiving and processing signals, is characterized in that:

signals are transmitted from a fixed point relative to the subsurface and using at least two electrical antennae;

signals reflected or backscattered by reflectors or diffusers of the said subsurface are received by means of the said electrical antennae and of three magnetic antennae;

and the said reflected or backscattered signals are processed with the aid of an algorithm in order to obtain the said imaging of the said subsurface.

Other characteristics and advantages of the present invention will become clear from the description given below, with reference to the appended drawings which illustrate an example of its application that is in no way limiting. In these drawings.

According to a preferred embodiment of the invention, the method for obtaining an image of a subsurface uses fixed ground-penetrating radar comprising a transmitter, a receiver, a set of at least two electrical antennae and three magnetic antennae and an electronic control and monitoring device for managing the signals transmitted and received. It consists of a stationary radar in which the transmitter and the receiver are positioned in the same place and in which signal transmission and reception must be separated in time. After the end of transmission, the receiver measures the echos. Furthermore, the electrical antennae are employed for transmitting these signals and the assembly of electrical and magnetic antennae is employed for receiving them.

According to an advantageous characteristic of the invention, in order to determine the direction of the waves that are reflected or backscattered and detected by the receiver, plane-polarized waves are transmitted by means of the said electrical antennae of the radar, and on the basis of measurement of three magnetic components of the reflected or backscattered waves, the direction of their propagation vectors is found using algorithms for processing and analysing the Maxwell equations that are satisfied by the electric and magnetic fields.

These circularly or elliptically plane-polarized waves can be obtained using two or three electrical antennae for transmitting signals that function simultaneously with a suitably chosen phase difference between the signals transmitted.

When possible, for terrestrial applications for example, it is advantageous, for improving the accuracy of the method, to make use of 3 electrical antennae, which then make it possible to measure six components of the reflected waves.

According to another operating method, it is also possible for linearly polarized waves to be transmitted independently along the 3 directions corresponding to each of the 3 electrical antennae; the complete assembly of 3 electrical antennae and 3 magnetic antennae being used for receiving them and determining their direction of arrival. In fact, the possibility of working with various polarization schemes offers a significant advantage for the method as it permits more detailed investigation of the diffusion properties of the subsurface reflectors.

Figure 1:
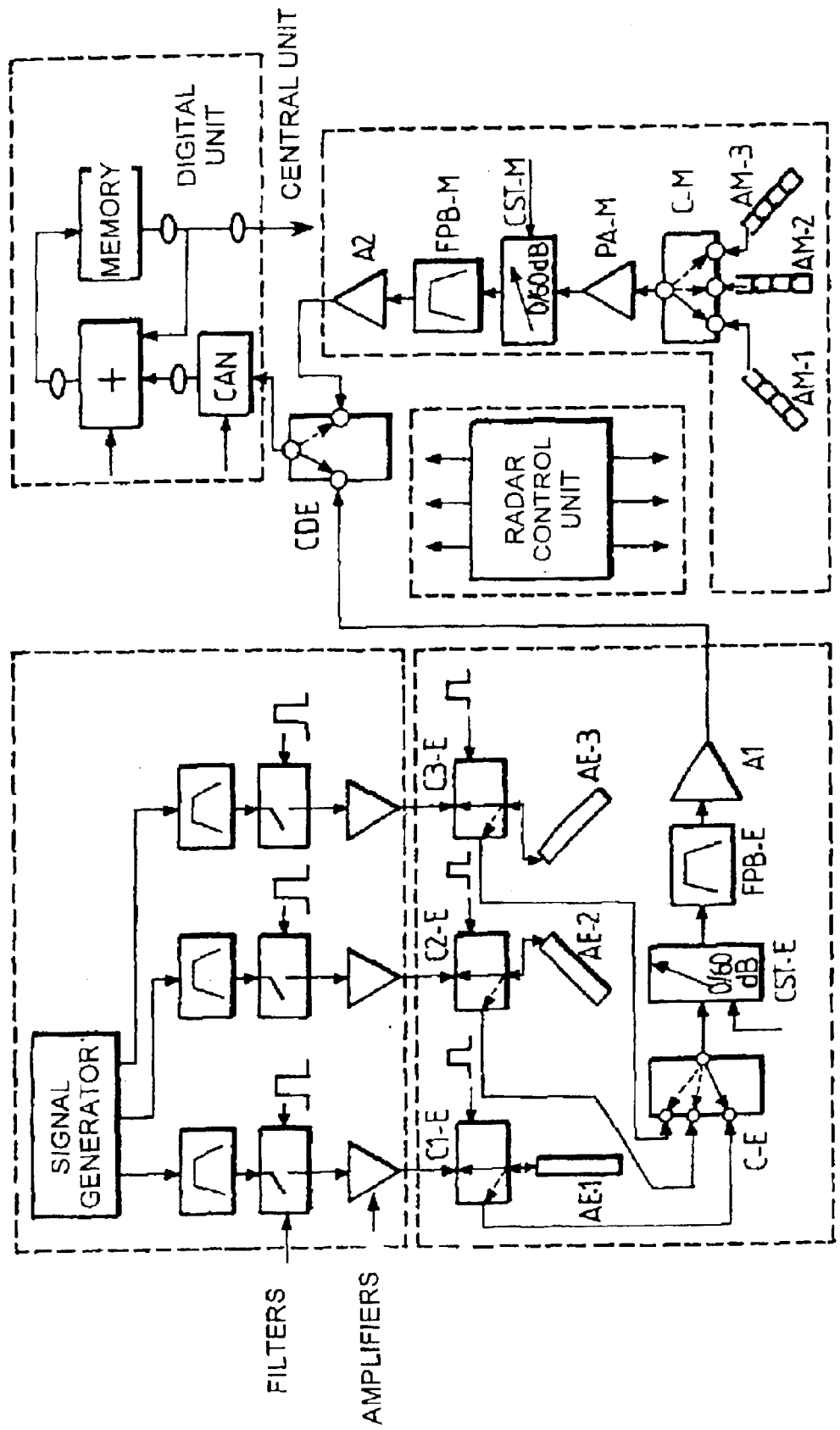
FIG. 1 shows a diagram of the electronic device of the radar according to the invention.

The electronic device wil now be described, which represents one embodiment of the method according to the invention. As shown in FIG. 1, this device preferably comprises five subsystems: a wave generator and amplifier, a receiver with an electrical antenna, a receiver with a magnetic antenna, a control unit of the radar and a digital unit.

The signals transmitted by the wave generator are, firstly, filtered so as to eliminate the undesirable spectral lines from the bandwidth of the radar, and secondly they are amplified. In addition, switches are provided at the inputs of the amplifiers in order to isolate the latter when they are not being used.

According to an advantageous characteristic of the invention, the signals transmitted by the wave generator are either in the form of a single pulse, or in the form of a coded pulse train. In this way the transmitted signals are coded, permitting better recognition of the signals that are reflected or backscattered, with the advantage that measurements can be effected with different time periods of the signals.

The electrical antenna receiver has three switches C1-E, C2-E and C3-E installed to protect the receiver against overloading, which could occur during the signal transmission period. There is a single amplifier Al associated with the electrical antennae AE1, AE2 and A3 and the latter is connected to each of them via a switch C-E coupled to a control device CST-E which causes the sensitivity to vary as a function of time. As a variant, it is also possible to use an amplifier for each antenna. The sensitivity controlling device CST-E consists of a variable attenuator, the attenuation of which decreases as time passes during the period of signal reception so as to provide approximate harmonization of the anticipated variation of the amplitude of the electric field with the depth of sounding. Moreover, a band-pass filter FPB-E removes all the unwanted signals from the useful frequency band, which might arise, for example, from electromagnetic interference. The time sensitivity controller CST-E and the band-pass filter FPB-E must preferably be configured so as to be suitable for the impedance of the antenna during the period of signal reception.

As the radar implementing the method which is the subject of the invention is fixed, the reflected electromagnetic field is also stationary, and the three antennae are connected in series with the amplifier so that complete measurement is effected whatever the plane of polarization of the waves.

In the magnetic antenna receiver subsystem, the signals from magnetic antennae AM1, AM2 and AM3 are measured in a similar manner: one antenna (AM) is selected by a switch (C-M) then connected to a preamplifier (PA-M); the output signal is then fed to an amplifier (A2) via a time-sensitivity controlling device (CST-M) and a band-pass filter (FBP-M). Just as with the electrical antennae, it is possible to use an amplifier for each antenna.

Finally, the digital unit comprises an analogue-digital converter CAN, a summer and a memory. Thus, the signal selected by a double-input switch CDE undergoes digital conversion and coherent integrations are then performed to take advantage of the fixed position of the radar and hence improve the signal-to-noise ratio. The control unit of the radar has the function of continuously generating all the signals required for the various operations.

A preferred embodiment of the electrical and magnetic antennae used in the radar will now be described.

The electrical antennae (AE1, AE2 and AE3) are typically half-wave dipoles whose optimum length is equal to a quarter of the wavelength used; the electrical resistance profile along the latter is adjusted so as to attenuate the internal reflections of the transmitted signals and damp the natural resonances that prevent observation of the shallower layers of the subsurface. As a variant, it is also possible to use quarter-wave monopoles.

Figure 2:
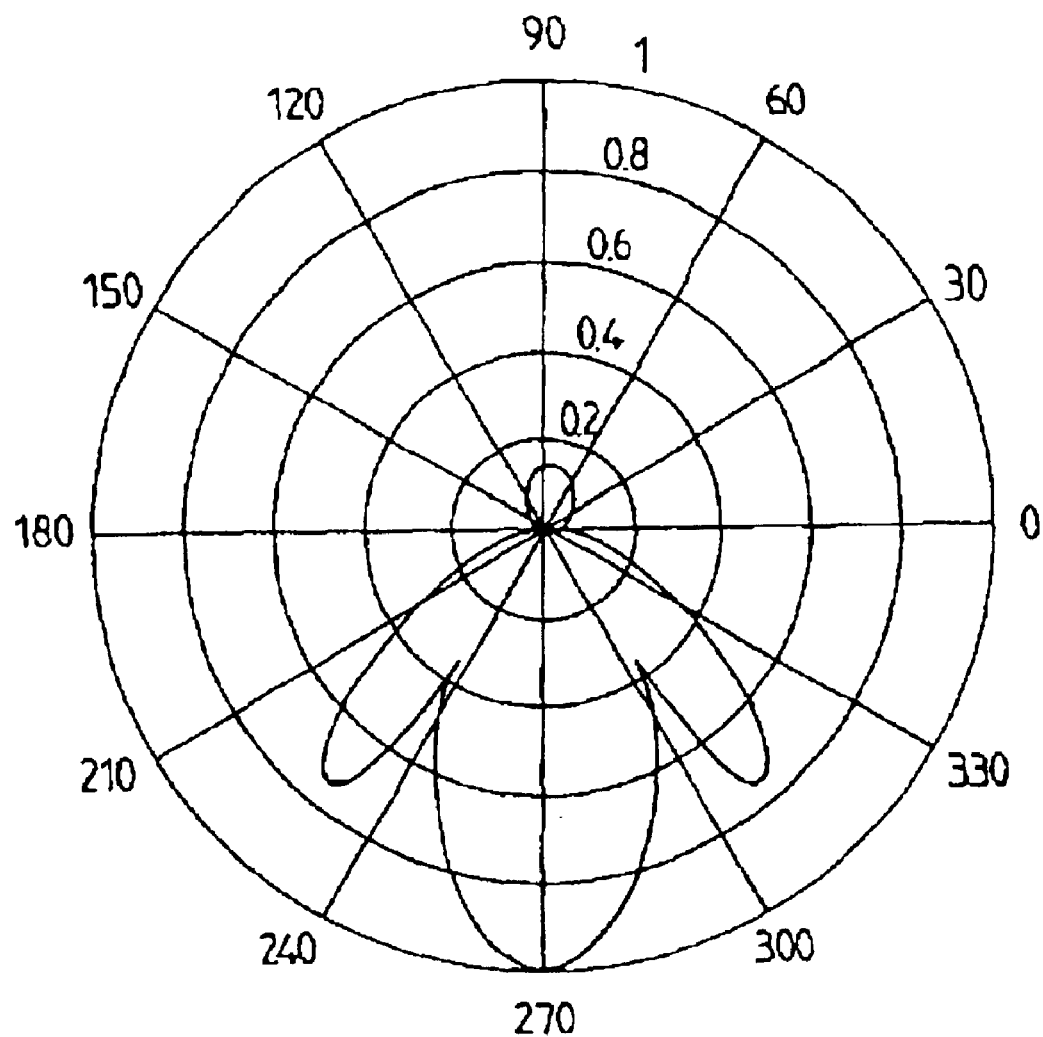
FIG. 2 shows a diagram of the radiation from an electrical antenna used in the ground-penetrating radar.
Figure 3A:
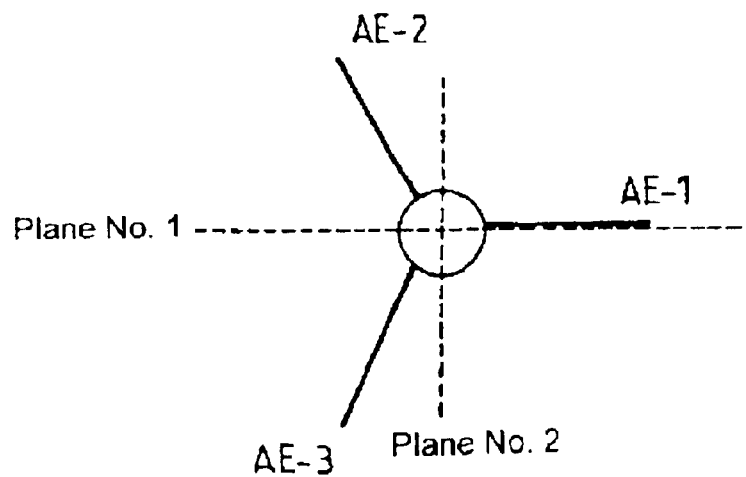
FIGS. 3a and 3b show the radiation diagrams of the 3 electrical antennae used simultaneously with a 1200 phase difference.
Figure 3A:
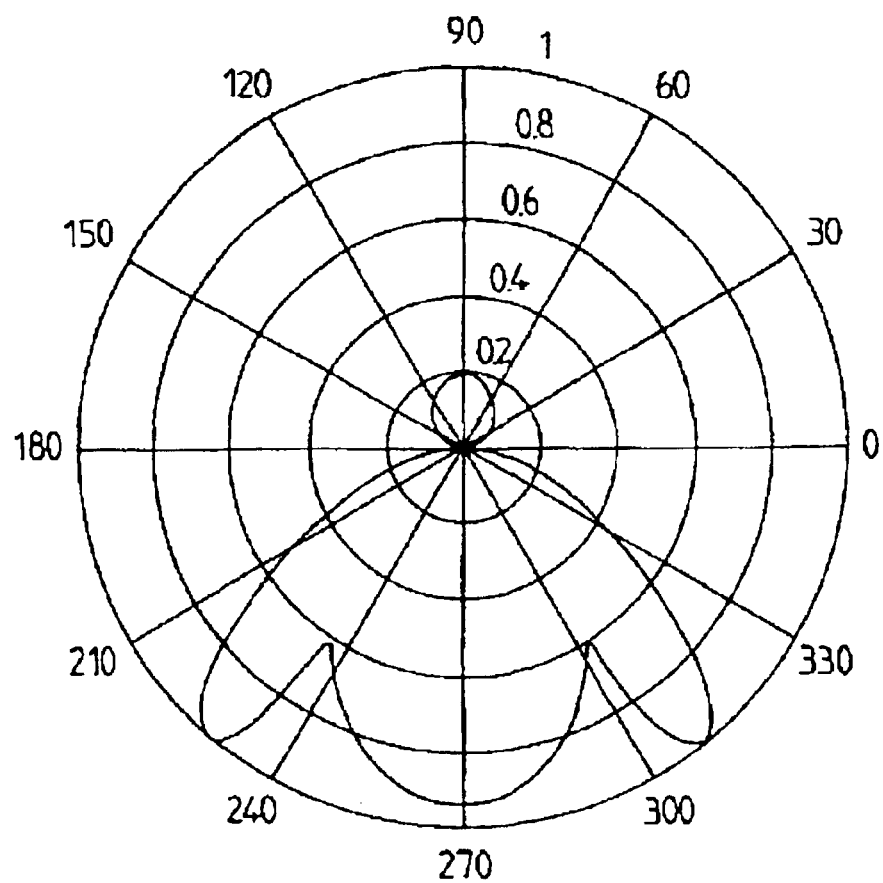
Figure 3B:
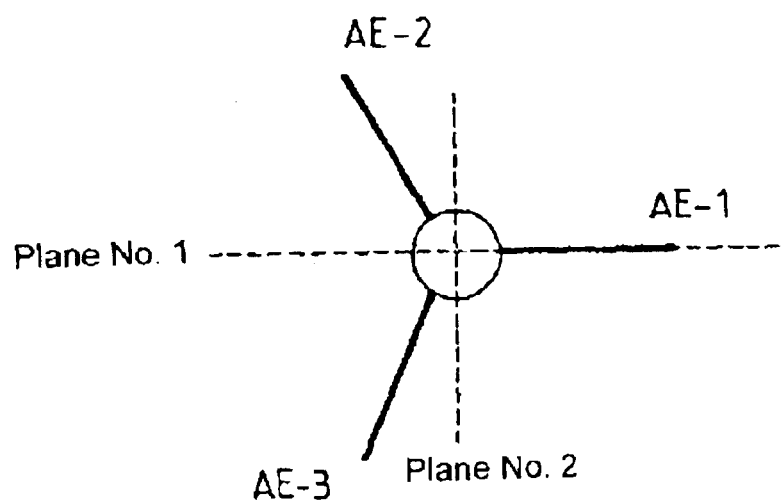
Figure 3B:
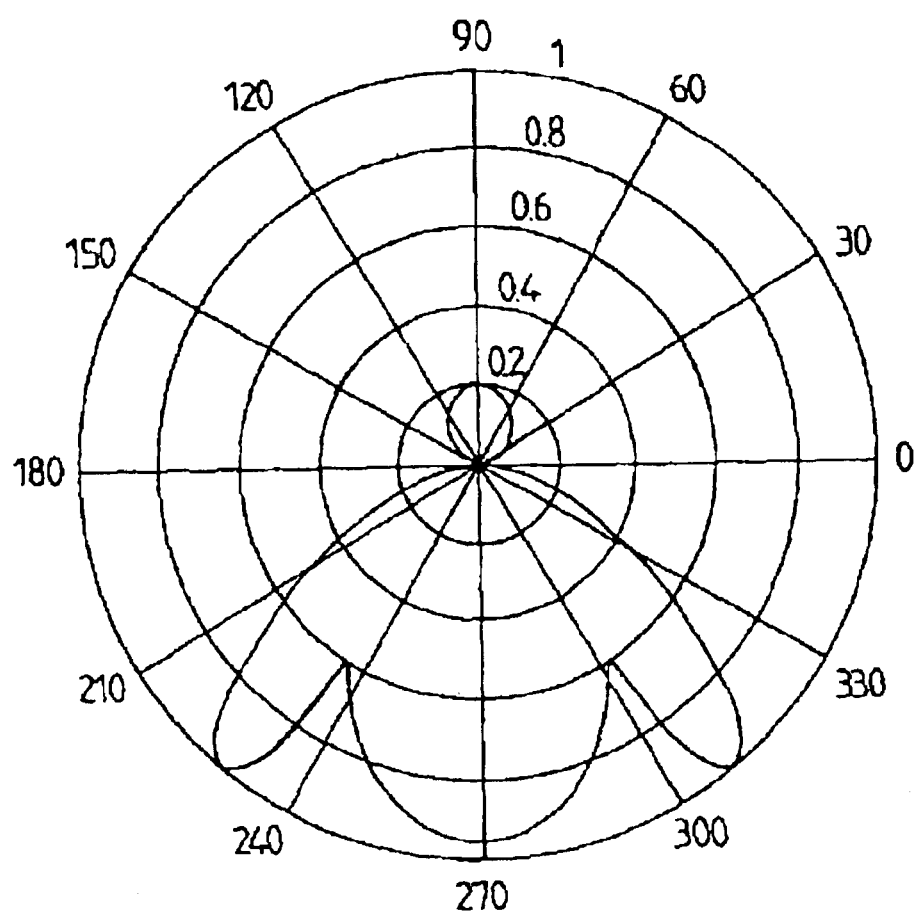
Figure 4:
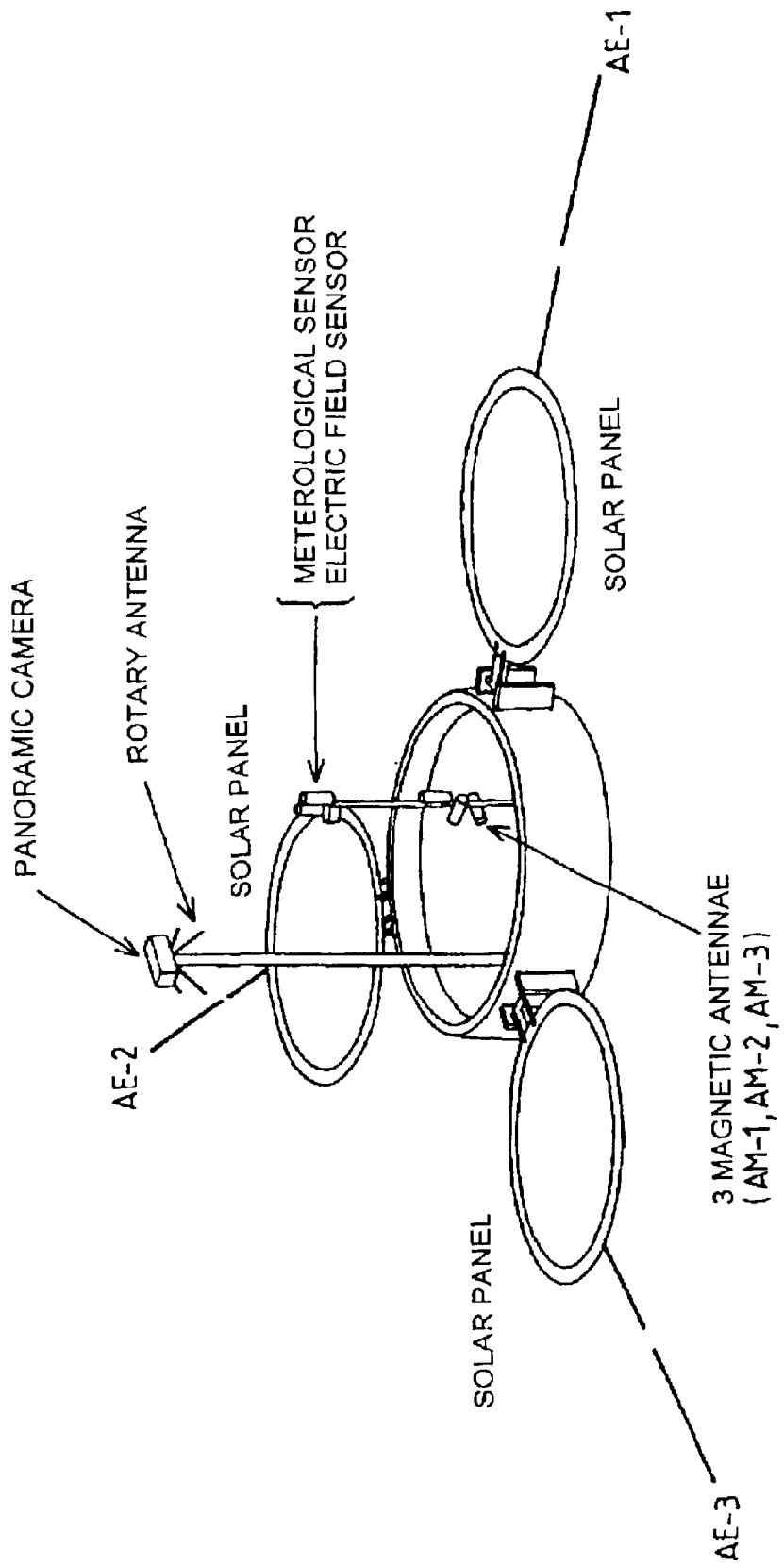
FIG. 4 is a perspective view of a module deployed on the surface of Mars comprising a radar according to the invention.

As shown in FIG. 2, the radiation diagram in the plane of the electric field of such an antenna, transmitting a linearly polarized wave, is characterized by a structure with lobes: a main lobe turned towards the ground, two secondary lobes and a smaller lobe directed upwards. Thus, the electrical antenna only gives significant illumination (or only sends significant energy) in a sector of angle less than 60°. FIGS. 3a and 3b also show the variations in radiated power as a function of the direction of propagation of 3 electrical antennae used simultaneously and with 120° phase shift between them. These antennae thus transmit waves that are polarized elliptically in a plane. The radiation diagrams 3a in plane No. 1 and 3b in plane No. 2 also show a structure with 3 lobes turned towards the ground.

According to an advantageous characteristic of the invention, the magnetic antennae (AM1, AM2 and AM3) are of the high-frequency flux return type; they each have a sensor and are connected to a preamplifier. The three sensors connected to the preamplifier are used for detecting the three magnetic components of the signals reflected on the radar. In fact, these magnetic antennae are arranged so as to form an orthonormal axis system which will serve as a reference for measuring the magnetic components of the reflected or backscattered signals, each component being detected by one of these sensors connected to the preamplifier. For this purpose, each of the sensors has a coil constituted by turns wound on a ferromagnetic core. The material of this ferromagnetic core is selected according to the frequency range. Thus, for a Mars mission, where this operating frequency is preferably chosen at around 2 MHz, the ferromagnetic core consists either of a ferrite rod, or of a bar. Furthermore, the primary and secondary turns of each sensor are made of enamelled copper wire and are wound on the core directly. Their structure is configured so as to minimize the parasitic capacitances. Each sensor is then placed in an epoxy resin structure whose outside surface is covered with a conducting layer that protects the sensor against the external electric fields and improves the thermal equilibrium of the system.

According to another advantageous characteristic of the invention, the three magnetic antennae of the radar implementing the method for obtaining subsurface imaging can be replaced by a single magnetic antenna that swivels in space so as to be correctly positioned for measuring the three magnetic components of the reflected or backscattered waves.

According to one application of the invention, the method for obtaining an image of a subsurface is used on board an automatic station set down on the surface of Mars for studying the underground geological structures of this planet and in particular for searching for the presence of ice and/or water in liquid form. For this purpose, as shown in FIG. 3, the Mars landing module has deployable solar panels, three magnetic antennae that are orthogonal to one another as well as three electrical antennae with angular spacing of 120°. Furthermore, a working frequency of the fixed radar is selected close to 2 MHz so as to sound the subsurface to a depth of about 3 kilometres. The optimum length of the antennae is equal to a quarter of the wavelength used and is therefore about 35 meters; the losses in propagation in the subsurface decrease with the wave frequency and the spatial resolution requires a broad pass band. Preferably, the measurements will be effected by day at a frequency below the critical frequency of the ionosphere which, in these conditions, plays the role of shield against the galactic electromagnetic noise.

According to other non-limiting applications of the invention, the device implementing the method according to the invention can be used in geology, for the detection of resources in a subsurface (groundwater levels, etc.) or for the exploration of geological structures, in the field of civil engineering for detecting obstacles buried at shallow depth (pipelines etc.) or for military applications (mine detecting, etc.), or even for applications in aerial radar. For this purpose, it is sufficient to select a working frequency appropriate to the dimensions of the object or obstacle to be detected and to the depth of sounding.

The present invention as described above offers many advantages; in particular, use of the said method for obtaining a three-dimensional image of the subsurface structure and of buried obstacles makes it possible, while limiting gridding and therefore the time and the difficulty of measurement, to obtain, by inversion, results that are more accurate, as they are based not only on measurements of echo propagation time but also on knowledge of their direction of arrival.

The present invention is not, of course, limited to the examples of application described and illustrated above, but encompasses all variants.

What is claimed is:

1. A method of subsurface imaging, using ground-penetrating radar comprising means of transmitting, receiving and processing signals, characterized in that:

signals are transmitted from a fixed point relative to the subsurface and with the aid of at least two electrical antennae;

signals reflected or backscattered by reflectors or diffusers of the said subsurface are received by means of the said electrical antennae and of three magnetic antennae;

and the said reflected or backscattered signals are processed using an algorithm in order to obtain the said imaging of the said subsurface.

2. A method according to claim 1, characterized in that, to determine the distance and direction of the said reflectors or diffusers of the said subsurface, waves that are polarized linearly, circularly or elliptically in a plane are transmitted using the said electrical antennae, and the components of the propagation vector of the reflected or backscattered signals are measured.

3. A method according to claim 2, characterized in that, to obtain waves that are polarized circularly or elliptically in a plane, the said signals are transmitted by means of two or three electrical antennae operating simultaneously with a suitably chosen phase difference between the said transmitted signals.

4. A method according to claim 2, characterized in that, to obtain linearly polarized waves, the said signals are transmitted independently along the respective directions of each of the said electrical antennae.

5. Radar for subsurface imaging, comprising:

at least two electrical antennae used both for the transmission of signals and the reception of signals reflected or backscattered by reflectors or diffusers in the subsurface, one or more magnetic antennae used for receiving the said reflected or backscattered signals, and an electronic device for controlling and processing these signals.

6. Radar according to claim 5, characterized in that the said electrical antennae are half-wave dipoles or quarter-wave monopoles.

7. Radar according to claim 5, wherein the said one or more magnetic antennae consist of a single magnetic antenna swivelling in space.

8. Radar according to claim 5, wherein the said one or more magnetic antennae include three magnetic antennae.

9. Radar according to claim 5, wherein the electronic device implements a method of subsurface imaging using ground-penetrating radar, wherein the method is characterized in that:

signals are transmitted from a fixed point relative to the subsurface and with the aid of at leant two electrical antennae;

signals reflected or backscattered by reflectors or diffusers of the said subsurface are received by means of the said electrical antennae and of three magnetic antennae;

and the said reflected or backscattered signals are processed using an algorithm in order to obtain the said imaging of the said subsurface.

10. Radar according to claim 5, characterized in that it is used in the military field for detecting mines or the like.

11. Radar for subsurface imaging, comprising:

at least two electrical antennae used both for the transmission of signals and the reception of signals reflected or backscattered by reflectors or diffusers in the subsurface, one or more magnetic antennae used for receiving the said reflected or backscattered signals, and an electronic device for controlling and processing these signals, wherein the radar is characterized in that it is used in the field of civil engineering for detecting obstacles buried at shallow depths.

12. Radar for subsurface imaging, comprising:

at least two electrical antennae used both for the transmission of signals and the reception of signals reflected or backscattered by reflectors or diffusers in the subsurface, one or more magnetic antennae used for receiving the said reflected or backscattered signals, and an electronic device for controlling and processing these signals, wherein the radar is configured to detect boned pipelines.

13. Radar for subsurface imaging, comprising:

at least two electrical antennae used both for the transmission of signals and the reception of signals reflected or backscattered by reflectors or diffusers in the subsurface, one or more magnetic antennae used for receiving the said reflected or backscattered signals, and an electronic device for controlling and processing these signals, wherein the radar is characterized in that it is used in the field of geology for the exploration of subsurface geological structures.

14. Radar according to claim 13, wherein the radar is configured to detect subsurface resources.

* * * * *